United States Patent [19]

Miller et al.

[11] Patent Number: 4,496,602
[45] Date of Patent: Jan. 29, 1985

[54] IMITATION BUTTERMILK DRY BLEND SUITABLE FOR RECONSTITUTION WITH MILK

[75] Inventors: Donald E. Miller, Norcross, Ga.; Cecilia Gilmore, Strongsville, Ohio; Steven R. Dimler, Bexley, Ohio; Charles E. Werstak, Medina, Ohio

[73] Assignee: SCM Corporation, New York, N.Y.

[21] Appl. No.: 547,894

[22] Filed: Nov. 2, 1983

[51] Int. Cl.$^3$ .................. A21D 10/00; A23L 1/09
[52] U.S. Cl. .................. 426/555; 426/578; 426/602; 426/613; 426/658
[58] Field of Search .......... 426/583, 653, 658, 573, 426/575, 578, 555

[56] References Cited

U.S. PATENT DOCUMENTS

| | | | |
|---|---|---|---|
| 3,235,387 | 2/1966 | Stumbo et al. | 426/583 X |
| 3,340,066 | 9/1967 | Corbin, Jr. et al. | 426/583 |
| 3,792,178 | 2/1974 | Noznick et al. | 426/583 X |
| 3,917,875 | 11/1975 | Gardiner | 426/573 |
| 3,955,009 | 5/1976 | Eskritt et al. | 426/578 |
| 3,974,034 | 8/1976 | Horn et al. | 426/658 X |
| 3,996,390 | 12/1976 | Igoe | 426/573 |
| 4,058,636 | 11/1977 | Igoe | 426/573 |
| 4,081,566 | 3/1978 | Haber | 426/578 |
| 4,081,567 | 3/1978 | Haber | 426/580 |
| 4,169,854 | 10/1979 | Igoe | 426/583 |
| 4,187,326 | 2/1980 | Serafino | 426/590 |
| 4,264,638 | 4/1981 | Sirett | 426/580 |
| 4,288,464 | 9/1981 | Smith | 426/548 |

*Primary Examiner*—Robert Yoncoskie
*Attorney, Agent, or Firm*—Richard H. Thomas

[57] ABSTRACT

The present invention relates to a non-dairy, fat-free, dry blend suitable for reconstitution with milk, to provide an imitation buttermilk product having the color, flavor, consistency and texture of cultured buttermilk. The dry blend of the present invention comprises, as essential ingredients, a major amount of maltodextrin; a minor amount of a milk soluble hydrocolloid gum; an acidifying amount of a food grade acid, of which a flavoring amount is acetic acid; and other flavorants and colorants. On reconstitution with milk, a stable product is obtained despite low pH in the range of about 4.2–4.6.

8 Claims, No Drawings

IMITATION BUTTERMILK DRY BLEND SUITABLE FOR RECONSTITUTION WITH MILK

TECHNICAL FIELD

The present invention relates to a non-dairy, fat-free dry blend suitable for reconstitution with milk, to provide an imitation buttermilk product having the color, flavor, consistency and texture of cultured buttermilk. The product of the present invention is particularly useful as a base in food recipes calling for buttermilk, such as salad dressings and baked goods, including cakes, biscuits and pancakes.

The dry blend of the present invention comprises, as essential ingredients, a major amount of maltodextrin; a minor amount of a milk soluble hydrocolloid gum; an acidifying amount of a food grade acid, of which a flavoring amount is acetic acid; and other flavorants and colorants. On reconstitution with milk, a stable product is obtained despite low pH in the range of about 4.2–4.6.

BACKGROUND ART

Dry buttermilk powders are on the market today, but they are mostly spray dried, natural, cultered buttermilk to which amounts of other ingredients have been added. Conventionally, the taste and texture of such products are poor. The reason for this is that the buttermilk, as with other milk products, loses a lot in the spray drying process due to the heat employed. Off-flavors are developed, and reconstitution with milk or water becomes difficult. Even with the addition of imitation or natural flavors, the off-flavors are difficult to mask, and the tendency to form a curdy mass makes it difficult to obtain a product having the body, texture and consistency of natural buttermilk.

For purposes of the present application, the term "natural buttermilk" refers to cultured buttermilk produced by the addition of bacterial cultures to skim milk, or acidified milk produced by the direct acidification of skim milk.

A major problem in making a tart-tasting product from an acid-containing dry mix, by reconstitution with milk, is that the pH of the milk is lowered below the isoelectric point of the protein in the milk product, causing curdling. This problem is alluded to in an Eskritt et al U.S. Pat. No. 3,955,009, which proposes that with a pregellatinized starch and a hydrocolloid gum, the curdling can be avoided. It is indicated that the pregellatinized starch permits such rapid rehydration and quick setting that the coagulation and curdling of the milk proteins is prevented. The patent is not concerned with preparation of an imitation buttermilk, but rather is concerned with the preparation of an imitation yogurt, which would have a spoonable thickness or viscosity substantially higher than that of an easily pourable, buttermilk-type product.

The principal ingredients in the Eskritt et al patent are sucrose, pregellatinized starch, citric acid, emulsifier and guar gum.

Other patents dealing with reconstitution of acid-containing dry mixes with milk include Gardiner U.S. Pat. No. 3,917,875; Igoe U.S. Pat. Nos. 3,996,390, 4,058,636, and 4,169,854; Haber U.S. Pat. Nos. 4,081,566 and 4,081,567; and Sirett et al U.S. Pat No. 4,264,638.

Serafino et al U.S. Pat. No. 4,187,326, describes a dry beverage mix clouding agent containing maltodextrin and smaller amounts of xanthan gum and titanium dioxide. An aqueous solution of the maltodextrin, xanthan gum and titanium dioxide is spray dried. It is indicated in the patent that the co-drying prevents precipitation of the titanium dioxide when the dry mix is hydrated. The beverage dry mix is intended to be dispersible in water to provide opacity. The mix is not reconstituted with milk, and when reconstituted with water, has little or no effect on viscosity.

Smith U.S. Pat. No. 4,288,464 describes a flavor enhancer composition intended to be added to foods, including beverages, to enhance their flavor. The flavor enhancer comprises a watersoluble carbohydrate, a sugar, and maltol, all of which are co-dried. An example of one water soluble carbohydrate, given in the patent, is Maltrin 10, described as a hydrolyzed cornstarch having a dextrose equivalent of about 10.

BRIEF DISCLOSURE OF THE INVENTION

The present invention resides in an improved non-diary, fat-free dry blend which, when reconstituted with milk, provides a stable imitation buttermilk having the color, flavor, consistency and texture of natural buttermilk. The product of the present invention, when reconstituted with milk, is useful alone, or as a base in the preparation of food recipes calling for buttermilk.

The dry blend of the present invention comprises a major proportion of malto-dextrin; a minor amount of a milk-soluble hydrocolloid gum; an acidifying amount of a food grade acid, of which a flavoring amount is acetic acid; the remainder being added flavorants and colorants. An acidifying amount is that amount which, on reconstitution with milk, produces a stable product having a pH between about 4.2 and about 4.6.

By "flavoring amount", it is meant that the acetic acid (vinegar solids) is present in an effective amount to provide a background which not only gives tartness, but surprisingly brings out or enhances the buttermilk flavors present in the dry blend. A "flavoring amount" is less than that amount which would give a vinegar or pickle taste. It is understood that the formulation of the present invention includes a food grade acid such as citric acid, in addition to the acetic acid, so that the entire acidity does not have to come from the acetic acid, which would induce a pickle taste.

The consistency and texture of natural (cultured) buttermilk is well known. It is relatively thin, and very smooth (without lumpiness). The proportions of ingredients in the present invention preferably provide, on reconstitution with milk, and refrigeration for about thirty minutes, a viscosity of about 200–500 cps, as determined on a Brookfield Synchro-lectric Viscometer, Model LVF, using a No. 2 or 3 spindle at a speed of 60 rpm. The amount of milk is one cup (8.6 ounces) to 0.75 ounces of dry blend.

A preferred dry mix of the present invention is the following formulation:

| Ingredient | Approximate Amount |
|---|---|
| Maltodextrin | 80–90% |
| Milk soluble hydrocolloid gum | 2.5–3.5% |
| Vinegar solids | .75–1.5% |
| Food grade acid | 3–5% |
| Flavorants and colorants | remainder |

Not included in the above formulation are relatively inert ingredients such as a starch carrier for the vinegar solids. By "inert", it is meant that they have little or no material effect on the properties of the final product, for instance flavor, consistency, or texture. This is due, in part, to the fact that such ingredients are present in too small amounts to have much effect.

It is a feature of the present invention that the reconstitution with milk can take place in-situ in the preparation of an end product employing the instant dry blend. For instance, a housewife, instead of adding buttermilk to a bakery formulation (e.g. pancakes), can add the instant dry blend to the other dry ingredients and then add sufficient milk to reconstitute the instant dry blend in addition to forming a pancake batter.

BEST MODE FOR CARRYING OUT THE INVENTION AND INDUSTRIAL APPLICABILITY

Maltodextrins and corn syrups are concentrated solutions of partially hydrolyzed starch normally produced from corn starch by acid and enzyme processes. They are defined on the basis of reducing sugar content, maltodextrin having the lowest dextrose equivalent, less than about 20. Maltodextrin is usually prepared from regular or waxy corn starch to about 12–20 dextrose equivalency, clarified, refined, and spray-dried to a moisture content of about 3–5% by weight. Principal uses of maltodextrins, corn syrups or corn syrup solids are in the confectionery industry, the canning and preserving industry, the baking industry, the ice cream and frozen dessert industry, for such products as coffee whiteners, jams and jellies and the like. In the beverage industry, the predominant use is in the beer and malt liquor areas, for the purpose of aiding in proper fermentation. Otherwise, they are not normally employed in beverage products.

A preferred maltodextrin is Maltrin M-100, marketed by Grain Processing Corporation which gives good results. Another suitable malto-dextrin is Fro-dex 15, marketed by The American Maize Products Co. Both are free-flowing, white powders which are bland in taste, with little or no sweetness. Maltrin M-100 has a dextrose equivalent of about 9–12, whereas Fro-dex 15 has a dextrose equivalent of about 15. Maltrin M-100 has a maximum moisture content of about 6%, and, in solution, provides a pH of about 4–4.7%. Its suggested uses are dry mixes, spray dried foods, frozen foods, confections, bakery items, non-dairy products, and snack foods.

A principal advantage of maltodextrin in the present formulation is that following reconstitution with milk, and establishment of a buttermilk consistency, no further appreciable viscosity increase occurs, even if the product is allowed to stand overnight. In other words, the product remains stable for normal usage periods.

The milk soluble hydrocolloid gum can be any of a number of gums commercially available, including xanthan gum, guar gum, locust bean gum, and carboxymethylcellulose. A preferred gum for use in the composition of the present invention is xanthan gum, a relatively high molecular weight polysaccharide. One suitable xanthan gum useful in the practice of this invention is Keltrol F, marketed by Kelco Division of Merck & Company. It is typically available in the form of a dry cream-colored powder having a moisture content of about 10%, a bulk density of about 52 lbs./cubic foot. and a particle size of about 100% through 80 mesh and a minimum of 92% through 200 mesh. The purpose of the hydrocolloid gum is to aid in increasing the viscosity of the fluid product when the mix is first reconstituted with milk, and also to provide body and texture in the final product.

The amount of hydrocolloid gum employed is preferably in the range of about 2.5–3.5. Too much gum causes the reconstituted product of the present invention to be stringy. It is important that the gum be cold milk soluble, and some hydrocolloids function well in milk and others do not. The advantage of the xanthan gum is that it provides increased viscosity, even when used in small amounts.

The acid employed in the present invention can be any food grade acid, such as lactic acid, acetic acid, citric acid, malic acid, and blends of the same. However, a preferred acid was found to be a flavoring amount of vinegar solids which, surprisingly, enhanced the buttermilk flavor without giving a pickle flavor. However, too much vinegar solids would provide a pickle flavor, so that the vinegar solids is preferably employed in combination with another food grade acid such as citric acid, to give a desired acidity pH of about 4.2 to 4.6.

A flavoring amount of vinegar solids is about 0.75–1.5%. A complementary amount of citric acid is about 3–5.

One suitable acid employed in the practice of the present invention is Beatreme 3455 K (trademark Beatrice Foods), a spray dried vinegar powder containing maltodextrin, modified food starch and vinegar solids. The formulation for Beatreme 3455 K is about 10% acid, and a carrier comprising maltodextrin and modified food starch in the ratio of about 60:40. The powder has a titratable acidity of about 9% minimum.

The use of vinegar powder in combination with about 3–5% citric acid (anhydrous) provides an excellent tart sensation as well as a background which results in an enhanced buttermilk flavor.

In the formulation of the present invention, the bulk of the formulation is maltodextrin. This compound is frequently used as a flavor carrier and, in the present invention, the contribution from flavors, although minor, is taken into consideration in establishing proportions of ingredients. By way of example, as mentioned, it is a carrier for the vinegar solids, in the product Beatreme 3455 K, making up, with modified starch, about 90% of the product. Thus, about 11% Beatreme 3455 K contributes roughly 1% vinegar solids, roughly 6% malto-dextrin, and roughly 4% modified food starch to the instant formulation. Similarly, it is contemplated that up to about 1% maltodextrin will be contributed by other flavors.

In the following example, the amount of maltodextrin in the dry blend formulation is about 83.4%. As will be seen, about 76.6% is added directly to the formulation, about 5.9% with the Beatreme 3455 K and about 0.9% with other flavors.

The modified food starch, which is supplied by the Beatreme 3455 K, in the amount of about 4% of the total dry blend formulation, is present in such small amount (about 0.2% may also come from other flavors) that it does not materially affect any of the properties of the dry blend when reconstituted. Thus, it is not a critical ingredient and for purposes of the present application, may be considered an inert ingredient, having no functional purpose in the formulation.

The following Example illustrates the practice of the present invention.

EXAMPLE I

In this Example, the following formulation was employed:

| FORMULA | |
|---|---|
| Ingredient | Percent |
| Maltodextrin (Maltrin M-100) | 76.6 |
| Beatreme 3455 K | 10.9 |
| Citric acid | 4.1 |
| Xanthan gum (Keltrol F) | 3.1 |
| Flavorants, etc. | 5.3 |
| TOTAL | 100 |

An ingredient breakdown and source is given in the following Table:

TABLE 1

| Ingredient/Source | Approx. Percents | Totals |
|---|---|---|
| Maltodextrin | | |
| Added directly | 76.6 | |
| from Beatreme 3455 K | 5.9 | |
| from other flavors | .9 | 83.4 |
| Xanthan gum (Keltrol) | 3.1 | 3.1 |
| Vinegar solids | 1 | 1 |
| Citric acid | 4.1 | 4.1 |
| Modified Food Starch | | |
| from Beatreme 3455 K | 4 | |
| from other flavors | .2 | 4.2 |
| | | 95.8 |

The balance, about 4.2%, comprises flavorants and the like.

In the preparation of the dry mix, the above ingredients are simply dry blended together, for instance with a conventional ribbon blender. The end product, when reconstituted* with milk in the proportion of about 0.75 ounces of dry blend to 1 cup of milk (8.6 ounces), exhibited no separation of fluid and solids and provided a product having a viscosity in the range of about 200–500 cps after 30 minutes of sitting at about 40° F. (refrigeration temperature). It was very flowable at normal use temperature, similar to that of natural buttermilk. The reconstituted mix had the same mouth feel, texture, and consistency of natural buttermilk, achieved without the presence of any fat. It was capable of successful utilization in all applications where natural buttermilk is used, for instance salad dressings, pancakes, cakes, biscuits, chip dips, and other sauces. Of very particular note was a distinct buttermilk flavor enhanced by the use of a flavoring amount of acetic acid. An obvious advantage of Maltrin M-100 in the present invention, in this respect, is its very bland flavor.

*Reconstitution was carried out in a conventional manner, in multiple steps, by first preparing a paste with about four ounces of the milk, and then adding the balance of the milk in one or two increments.

A surprising aspect of the present invention is the ability to provide a relatively low-viscosity, acid-containing dry mix which, on rehydration, gave a viscosity equivalent to that of natural buttermilk (relatively thin), and when so rehydrated, did not cause curdling of the milk.

During a normal usage period, up to overnight, the viscosity of the buttermilk remained substantially constant.

For purposes of comparison, a number of other carbohydrates were evaluated, by substituting them for the Maltrin M-100 in the basic buttermilk formulation. The following Table gives the results obtained.

TABLE 2
EVALUATION OF POSSIBLE SUBSTITUTES FOR MALTRIN M-100

| | Type | Characteristics Of Reconstituted Product | Flavor |
|---|---|---|---|
| "Redisol 88" (A. E. Staley) | Pregelatinized Tapioca Starch | Pasty, lumpy, does not rehydrate uniformly | Bland |
| Nucol 4227 (A. E. Staley) | Cold Water Swelling Corn-Based Starch | Very lumpy - starch not uniformly hydrated | Bland |
| National 1215 (National Starch) | Pregelatinized Corn Starch | Very lumpy - thick like Nucol | Bland |
| Polar Gel #1 (American Maize Products) | Modified Waxy Maize | Thin, very lumpy - starch not hydrated | Bland |

Other carbohydrates evaluated include instantized starch (instant Pureflo F, trademark of National Starch) which gave good solubility and a good texture, but was too thick (not pourable) after overnight standing; ITJ 434 (trademark of A. E. Staley), which was not immediately rehydratable; Instant Clear Jel (trademark of National Starch), a waxy maize starch, which was not immediately soluble; and 24 DE Corn Syrup Solids, American Maize Products, which was too sweet. Others that were not immediately soluble included Instant Tender Jel C (A. E. Staley); Instant 721-A (American Maize); Instant 24-924 (American Maize); and Instant 721-AE (American Maize).

The preferred gum, xanthan gum, gave good viscosity and good solubility, immediately.

EXAMPLE 2

This Example illustrates practice of the present invention where the dry blend is added directly to a dry mix of ingredients and reconstitution is carried out in situ.

The following buttermilk pancake recipe was used:

1 cup flour
1 tablespoon sugar
1 teaspoon baking powder
½ teaspoon baking soda
½ teaspoon salt
3 tablespoons instant dry blend buttermilk substitute of Example 1
1 cup milk
1 egg, slightly beaten
2 tablespoons vegetable oil All dry ingredients were combined in a bowl, and milk, egg and oil were added and beaten until smooth. The product exhibited no stringiness or lumpiness of the buttermilk substitute and rehydration was complete. The product had a good buttermilk flavor.

Examples of other products which can be made with in-situ rehydration include yellow cakes, biscuits, and muffins.

In Example 1, the dry blend of the present invention was reconstituted with milk in the ratio of about 0.75 ounces of dry blend to one cup of milk. This is a weight proportion of about 92% milk to 8% dry blend, (obtained by adding 8.6 and 0.75 and dividing the sum into the separate parts). Obviously, this ratio can vary, and the viscosity of the end product will correspondingly vary. It was found that as long as the reconstitution was carried out to achieve a viscosity in the range of about 200-500 cps, the end product was smooth, free of lumpiness, and free of protein precipitation that might be expected to occur on acidification of milk.

We claim:

1. A non-dairy, fat-free dry blend suitable for reconstitution with milk to provide an imitation buttermilk product having the same color, flavor, consistency and texture as natural buttermilk, comprising
    a major amount of maltodextrin having a dextrose equivalent less than about 20;
    about 2.5-3.5% of a milk soluble hydrocolloid gum;
    an acidifying amount, effective on reconstitution with milk, to provide a pH in the range of about 4.2-4.6, of a food grade acid, of which a flavoring amount is acetic acid;
    the remainder being flavorants and colorants;
    said major amount of maltodextrine, with other ingredients of the dry blend, being an effective amount which, on rehydration with milk in the approximate weight proportion of about 92% milk to about 8% dry blend, provides a viscosity in the range of about 200-500 cps.

2. A non-dairy, fat-free dry blend suitable for reconstitution with milk to provide an imitation buttermilk product having the same color, flavor, consistency and texture as natural buttermilk, comprising
    about 80-90% maltodextrin having a dextrose equivalent less than about 20;
    about 2.5-3.5% of a milk soluble hydrocolloid gum;
    an acidifying amount, effective on reconstitution with milk to provide a pH in the range of about 4.2-4.6, of a food grade acid, of which a flavoring amount is acetic acid;
    the remainder being flavorants and colorants;
    said dry blend on rehydration with milk providing a viscosity in the range of about 200-500 cps.

3. The dry blend of claims 1 or 2 wherein said gum is xanthan gum.

4. The dry blend of claims 1 or 2 wherein said maltodextrin has a D.E. of about 9-12 the range of about 4.2-4.6.

5. The dry blend of claims 1 or 2 wherein said food grade acid is a blend of citric acid and acetic acid in the ratio of about 7:1 to 2:1 citric acid to acetic acid.

6. A non-dairy, fat-free dry blend suitable for reconstitution with milk to provide an imitation buttermilk product having the same color, flavor, consistency and texture as natural buttermilk, comprising
    about 80-90% maltodextrin having a dextrose equivalent of about 9-12;
    about 2.5-3.5% xanthan gum;
    an acidifying amount, effective on reconstitution with milk, to provide a pH in the range of about 4.2-4.6, of a food grade acid, of which a flavoring amount of acetic acid;
    the remainder being flavorants and colorants;
    said dry blend on rehydration with milk in the approximate weight proportion of about 92% milk to 8% dry blend providing a viscosity in the range of about 200-500 cps.

7. A dry batter mix for baked or fried products containing the dry blend of claims 1, 2 or 6 and amounts of batter ingredients effective for preparing baked or fried products, said dry batter mix being suitable for rehydration with milk.

8. The dry blend of claim 6 wherein said food grade acid is a blend of citric acid and acetic acid in the ratio of about 7:1 to 2:1 citric acid to acetic acid.

* * * * *